United States Patent [19]

Plasencia et al.

[11] Patent Number: 4,558,373
[45] Date of Patent: Dec. 10, 1985

[54] AUTOMATIC DATA CAPTURE SYSTEM WITH SPECIAL DOCUMENT HANDLING PRIOR TO NORMAL SCANNING

[75] Inventors: Armand J. Plasencia, Hopatcong; Robert J. Tusso, Chatham; Alan P. Gilson, Boundbrook, all of N.J.

[73] Assignee: Skantek Corporation, Warren, N.J.

[21] Appl. No.: 609,299

[22] Filed: May 11, 1984

[51] Int. Cl.$^4$ .................. H04N 1/04; H04N 1/10; H04N 1/02

[52] U.S. Cl. .................... 358/285; 358/293; 358/294; 271/227; 271/228; 271/265; 271/273; 271/902

[58] Field of Search .............. 358/285, 293, 294; 271/265, 267, 268, 272, 273, 274, 227, 228, 225, 902; 209/534; 382/7

[56] References Cited

U.S. PATENT DOCUMENTS

| | | | |
|---|---|---|---|
| 3,575,411 | 4/1971 | Kastelic | 271/227 |
| 3,870,629 | 3/1975 | Carter et al. | 382/7 |
| 4,326,222 | 4/1982 | Connier et al. | 358/285 |
| 4,360,195 | 11/1982 | Schön et al. | 271/267 |
| 4,455,018 | 6/1984 | Colglazier et al. | 271/902 |
| 4,478,405 | 10/1984 | Eertink et al. | 271/227 |

Primary Examiner—Howard W. Britton
Assistant Examiner—John K. Peng
Attorney, Agent, or Firm—Philip Young

[57] ABSTRACT

An automatic video digitizing system for document scanning wherein a document is inserted into a roller feed arrangement located adjacent a video scanning head. The system includes a front pair and a rear pair of drive rollers located respectively in front of and behind the video scanning head. The ones of each pair of document drive rollers are initially spaced apart to permit the document to be inserted through the spacing between the drive rollers without damaging the input edges of the document. Lift means are operatively connected to the drive rollers for moving the opposing drive rollers from their spaced-apart, non-feed position into contact with each other. A motor drive operates in response to a document position sensor for driving the document backwards to a predetermined starting position where a front edge of the document is located at a preset distance from the video scanning head. After the document is positioned at its starting position, the motor drive rotates the drive rollers for driving the document forward for scanning thereof.

16 Claims, 4 Drawing Figures

AUTOMATIC DATA CAPTURE SYSTEM WITH SPECIAL DOCUMENT HANDLING PRIOR TO NORMAL SCANNING

TECHNICAL FIELD

The present invention relates to automatic data capture peripheral machines for CAD systems, and more particularly to automatic video digitizing systems employing special document handling techniques.

BACKGROUND ART

Automatic data capture has been a continuing concern of advanced thinkers in the field of drafting and design automation since the start of computer aided design (CAD). Although CAD systems have been in use for over ten years, there are still mountains of manually prepared drawings in the world today. In fact, recent studies show that there are over 2 billion active drawings in the United States alone. Most companies file thousands of drawings in their vaults, with approximately 20 percent active each year. It is estimated that 10 percent of the drafting effort in the United States is expended merely in drawing maintenance. During use, they become dirty, smudged or torn and must be refurbished regularly. One long standing problem has been how to get these drawings into a CAD system for automatic data updating and to avoid degradation of the file material. Automatic data capture systems have recently been developed for solving such problem.

Installing a CAD system is a major decision that involves not only cost factors, but the problem of how to manage the capture of data from older drawings and new ones that continue to be prepared. One problem inherent in the use of data capture systems is that of handling the documents. More particularly, in many systems, the document is inserted into a receiving area of the machine until its edge abuts with an upper and a lower drive roller and pressure roller which are intimately in contact with each other for receiving the edge of the document along the contact edge of the rollers and driving the document therebetween in a forward direction. One problem associated with this type of document feed into abutting rollers, which are idling and waiting for the document to be inserted, is the hazard of damaging the document edges as they are pulled by the rollers. Some document handling systems provide document guides to assist the operator in feeding the document to the rollers in an aligned manner to thereby present the entire document edge rather than a corner of the document to the rollers. However, the human factor requiring the operator to exactly align the document is one factor in the damage caused to the document. Other human factors contributing to document damage occur when the operator may push the document against the drive rollers and, also, the reflex action which may occasionally occur when the rollers initially pull the document away from the operator whereby the operator responds instinctively by pulling the document back.

Various types of document handling and document conveying systems are known wherein the document is inserted between a drive roller and a pressure roller. For example, in Von Namen U.S. Pat. No. 3,761,075, the pressure roller is moved away from the drive roller and a document stop mechanism operates to insert a document stop element in the path of the document for the purpose of aligning the leading edge of the document. A secondary document conveying mechanism is required to clamp and control the document in its alignment position until the primary document control means engages the document between the pressure roller and the drive roller for controlling movement of the document. This additional document control and alignment means over and above the simple drive mechanism for the document, with consequential higher manufacturing costs and possible additional maintenance problems. Another type of document handling system is the moving belt type disclosed in Rothbart et al U.S. Pat. No. 4,424,535 wherein a high speed document manipulator includes a moving belt arrangement for reversibly translating a document and for turning the document over so as to be able to read both sides of the document. This type of document handling system requires a large belt and table working area as well as a vacuum system for flipping the document.

Therefore, it is an object of the present invention to provide a document handling system of the drive roller and pressure roller type wherein the document is initially received and moved in a simple manner and without complex and bulky apparatus while at the same time protecting the document from tearing and other damage at the document edges. It is another object to provide a document handling system incorporating the drive roller and pressure roller which avoids the damage to the document often caused by operator errors. It is another object to provide a technique for handling documents in an automatic data capture system having a video digitizer. It is a further object to provide for document handling prior to normal scanning in an automatic video digitizer system.

SUMMARY OF THE INVENTION

These and other objects are achieved by the present invention which provides an automatic video digitizing system for document scanning wherein a document is inserted into a roller feed arrangement located adjacent a video scanning head. The system includes a front pair and a rear pair of drive rollers located respectively in front of and behind the video scanning head. The ones of each pair of document drive rollers are initially spaced apart to permit the document to be inserted through the spacing between the drive rollers without damaging the input edges of the document. Lift means are operatively connected to the drive rollers for moving the opposing drive rollers from their spaced-apart, non-feed position into contact with each other. A motor drive operates in response to a document position sensor for driving the document backwards to a predetermined starting position where a front edge of the document is located at a preset distance from the video scanning head. After the document is positioned at its starting position, the motor drive rotates the drive rollers for driving the document forward for scanning thereof.

According to one embodiment, the document is inserted into the roller feed section through a front entrance slot leading into a front pair of rollers comprising an upper pressure roller and a lower drive roller and a rear pair of rollers comprising an upper pressure roller and a lower drive roller. Prior to the start of the scanner operation, during insertion of the document, the top rollers are raised by a small amount by the action of a lift motor drive being commanded by a computer. Concurrently, the lower rollers are lowered by a lift motor drive thereby permitting the document to be inserted between the upper and lower rollers. The computer is also associated with a motor control for activating a stepper motor drive which causes the lower drive rollers to rotate and move the document in a forward or reverse direction.

Two sets of paper sensors are respectively located in front and rear positions along the document path adjacent the front and rear pairs of rollers, respectively. The paper sensors provide sensing signals to the computer for indicating the position of the document for initiating the action of the motor drives.

DESCRIPTION OF THE PREFERRED EMBODIMENTS

Figure 1:
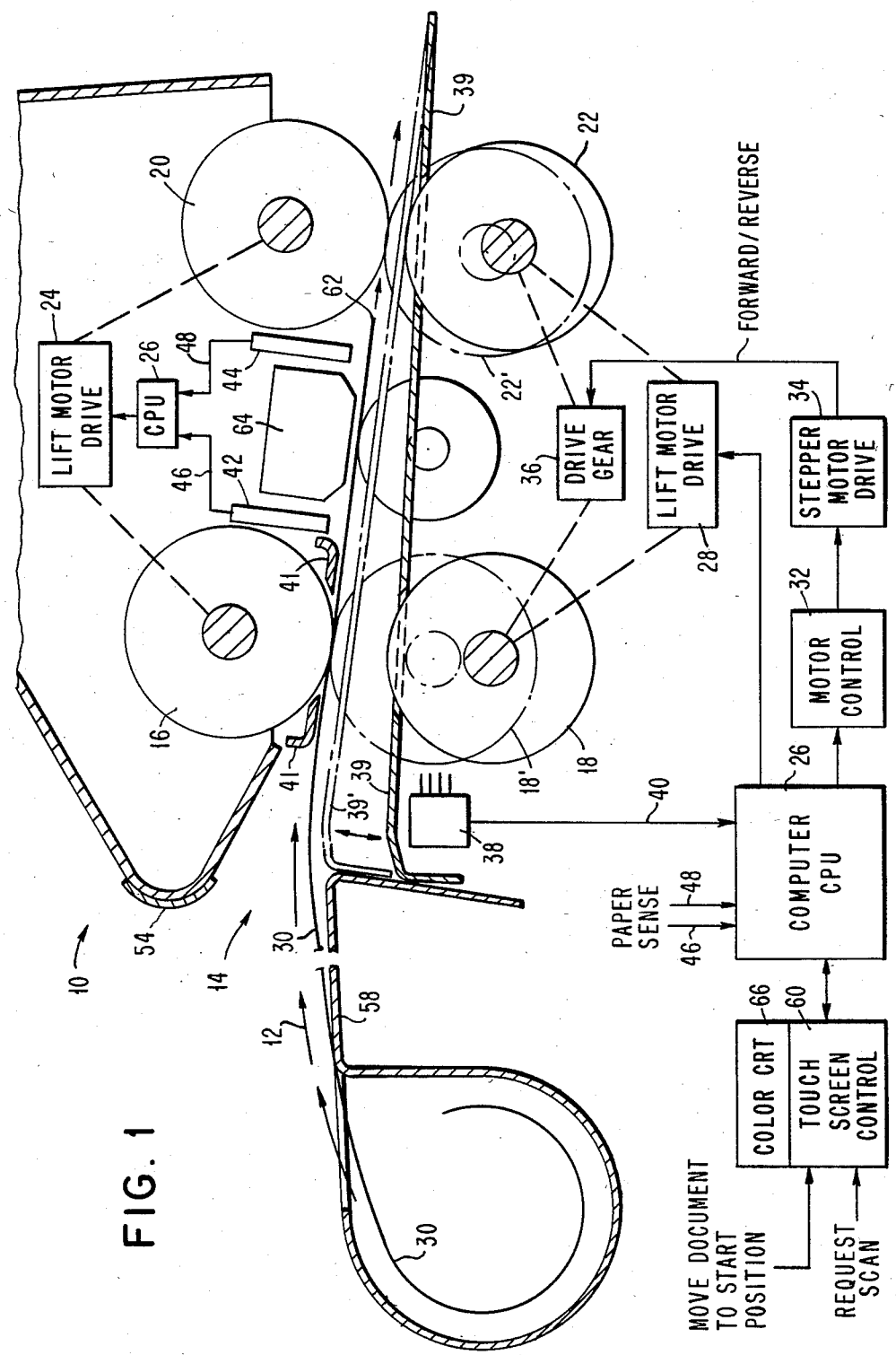
FIG. 1 is a partial elevation view of an optical scanner unit and a functional block diagram of the system, illustrative of the present invention.

Referring to FIG. 1 there is shown a partial elevation view of an optical scanner unit 10 showing a portion of the document feed path 12 and including a functional block diagram of the system for controlling the document receiving rollers and the document drive control in accordance with the present invention. Specifically, a document is inserted into the roller feed section through a front entrance slot 14 leading into a front pair of rollers comprising an upper pressure roller 16 and a lower drive roller 18, and a rear pair of rollers comprising an upper pressure roller 20 and a lower drive roller 22. Prior to the start of the scanner operation, during insertion of a document, the top rollers 16 and 20 are raised by a small amount, by the action of a lift motor drive 24 being commanded by a computer 26. Concurrently, the lower rollers 18 and 22 are lowered by lift motor drive 28 thereby permitting a document 30 to be inserted freely between the upper and lower rollers. The lower rollers 18 and 22 are shown in respective broken lines 18′ and 22′ to illustrate the insertion positions and the drive positions of the rollers. Computer 26 is also associated with a motor control 32 for activating a stepper motor drive 34 which through drive gears 36 causes the lower drive rollers 18 and 22 to rotate and move the document 30 in a forward or reverse direction in accordance with the present invention. A pair of lower front roller position sensors 38 are located adjacent the lower drive roller 18 for determining whether such roller is completely up or down in its correct position. This allows insertion of the document and determines which such document can be advanced through the feed system. Roller position sensor 38 is connected via line 40 to computer 26 to provide the signals for permitting such computer to cause motor control 32 to activate the stepper motor drive 34 for advancing the document 30.

Figure 2:
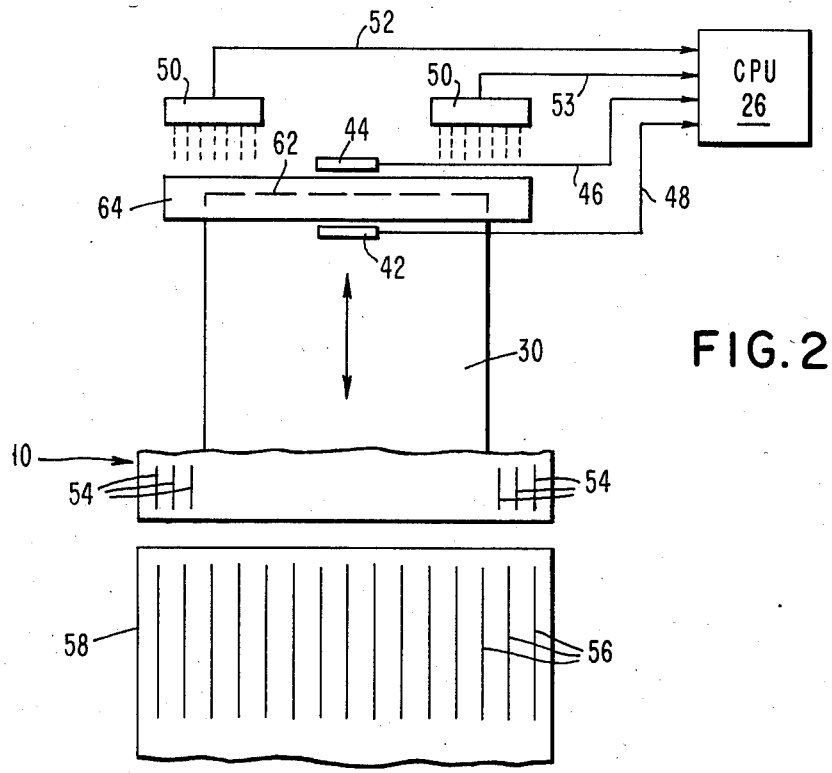
FIG. 2 is a top view of the document insertion area including the document support platform and document guide scale.

Two paper photodiode sensors 42 and 44, shown in FIG. 2, are respectively located in front and rear positions along the document path adjacent the first roller pair 16, 18 and the second roller pair 20 and 22, respectively. Paper sensors 42 and 44 provide sensing signals respectively on lines 46 and 48 to the computer 26 for indicating the position of the document 30 to thereby enable the determination of the position of the document for initiating the action of the various motor drives. Front sensor 42 is located behind and at the center of the pressure roller 16 while, similarly, the rear sensor 44 is located ahead of and at the center of upper pressure roller 20. The front sensor 42 is used to sense the tail edge of the document that is being scanned and to signal the computer 26 to complete the scan, stop the stepper motor, and open the drive rollers in order to remove the document. The rear sensor 44 is used to sense the lead edge of the document that is to be scanned to insure that the document is inserted past the scan head 64 prior to closing of the rollers and to sense the lead edge of the document when the document is driven in reverse by the rollers 16, 18, 20 and 22 to the start of scan position.

A pair of paper edge sensors 50 and 51 shown in FIG. 2 are located at the sides of the document path for detecting the wandering of the document into either side of the path. The sensors 50 provide signals via lines 52 and 53 to the computer 26 for further controlling the action of the drive rollers for halting the travel of the document in anticipation of corrective action, the details of which do not form a part of the present invention.

As described above, referring to FIGS. 1 and 2, the document 30 is put into the roller feed through the front entrance slot 14. Above the entrance slot 14 is a ruled scale 54 starting from the right-hand side. The units can be in English inches ranging from 0 to 40 in steps of one, and in Metric centimeters ranging from 0 to 100 in steps of five. This scale 54 is used for selecting specific areas for scanning. Another guide scale 56 is silk-screened onto a supporting platform 58 leading into the entrance slot; this has zones marked for locating standard engineering drawings ranging from A through E. Guide scale 56 helps to speed set-up.

The front rollers 16 and 18 are rubber coated and kerfed to mesh with upper and lower paper guides 41 and 39, respectively, assuring proper positioning of the document and minimizing possible jams. In the loading position, lower paper guide 39 is indicated as shown, while in the normal document drive position, paper guide 39′ illustrates such drive position. The bottom roller 18 is driven by the stepper drive motor while the top roller 16 floats freely resting under its own weight to hold the document against the bottom drive roller. The rollers are for example, 1.5 inches in diameter and span 40 inches. Neoprene rubber is used with a 1 inch steel core. All four feed rollers are kerfed with 0.5 inch slots on 1.0 inch centers. The kerfs permit two slotted plates to act as paper guides assuring easy loading of documents, even those that are dog-eared. During insertion of a document, the top rollers 16 and 20 are raised by action of the lift motor drive 24 commanded through the software control of computer 26 via a touch screen control 60. Concurrently, the lower set of rollers 18 and 22 is lowered by lift motor drive 28 thereby letting the document slide between two smooth slotted plates. A command from the touch screen control 60 closes the rollers 16, 18, 20 and 22 and the stepper motor 34 slews the document 30 to where its leading edge 62 is aligned to a fiber optic scanhead 64. The position of the leading edge 62 of the document 30 relative to the scanhead 64 and the front and rear paper sensors 42 and 44 are shown in FIG. 3.

Figure 3:
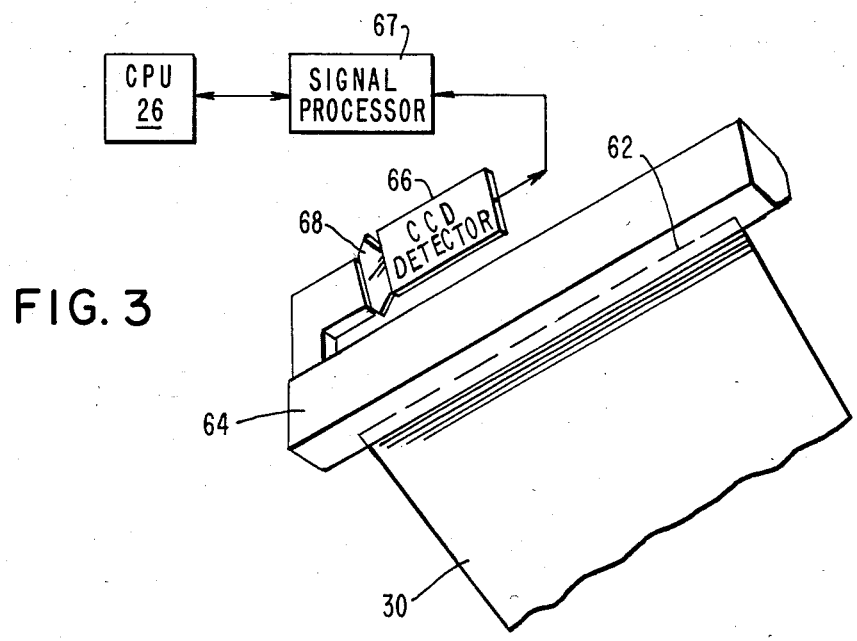
FIG. 3 shows the relation of the leading edge of the document to position of the optical fiber scan head, including the CCD detector.

The scanner unit 10 may comprise a linear to grid optical fiber scanhead 64 with the grid end of the fibers having its light focused onto the pixels of a CCD detector 66 shown in FIG. 3. The roll feed mechanism is normally open with rollers 16 and 18, and 20 and 22 separated so that the document is easily inserted to a distance of a few inches. No special care is required since the roll feed closes automatically when scanning is requested and backs the drawing out of the unit until the leading edge is just at the aperture line of the optical fiber scanhead 64. Between scans, the roll feed advances the paper in small increments, ultimately moving the entire drawing into an out-feed tray where it is contained until removed by the operator.

The illuminating line of optical fibers, of scanhead 64 transmit light emerging from an incandescent light source to illuminate uniformly a 300 micron wide band across the drawing. An adjacent row of optical fibers serve as apertures. Each fiber gathers light that is modulated by the markings on the drawing. The light is transmitted by the aperture fibers to a collecting lens assembly 68 that orients and focuses the light from each individual optical fiber onto pixels of the CCD detector 66. The output of CCD detector 66 is processed in signal processor 67 of CPU 26.

Figure 4:
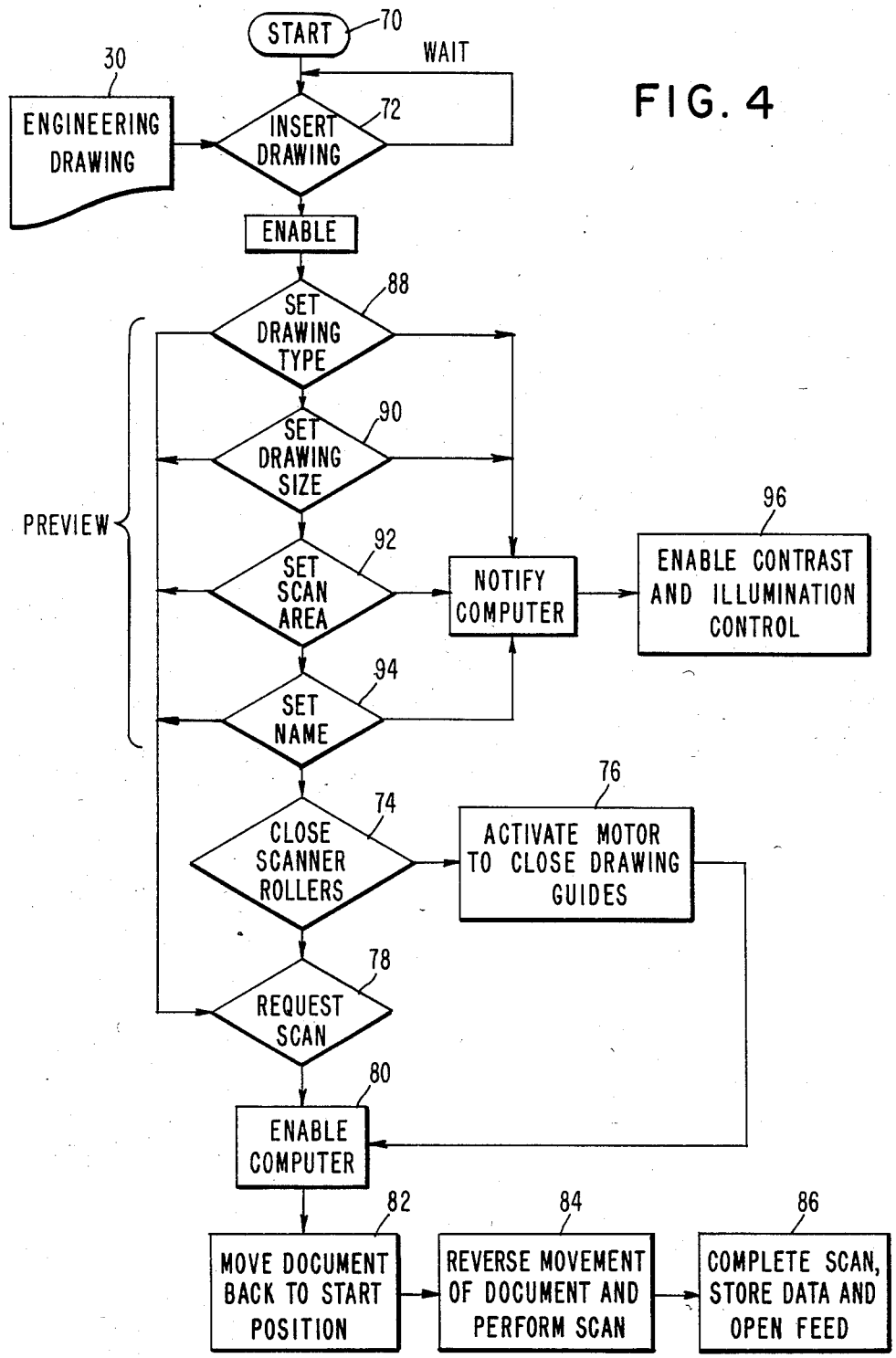
FIG. 4 is a system flow diagram in accordance with the operation of the present invention.

The operation of the system of the present invention will now be further described with respect to the system flow diagram of FIG. 4. Computer 26 comprises a 32-bit microcomputer running the operating system used to control all processes. The microcomputer responds to commands that are received on activation of membrane touch-screen on the color touch screen control 60 shown in FIG. 1. The process begins by activating a single power switch 70 on the side of the scanner unit 10 and inserting at 72 a drawing into the scan slot 12. After power-up of the unit, colored visual instructions and button symbols appear on the CRT 66 of the touch screen control 60. Easily-comprehended fields are displayed that are touched by the operator. For example, the image of a keyboard is displayed and touched to enter the name of the drawing file to be generated. An audible response is given, and color changes occur on the touch buttons to confirm a correct response to the visual requests for operator action.

After the drawing is inserted between the open rollers 16 and 18 and 20 and 22, the start operation is initiated at 70, the lower drive rollers 18 and 22 are activated by the computer 26 through the lift motor drive 28 to close the rollers. This step is indicated by numerals 74 and 76 in FIG. 4. Generally, a scan request at 78 will cause the rollers to close automatically onto the drawing and the computer 26 at step 80 will cause the motor control 32, the stepper motor drive 34 and drive gear 36 to move the drawing backwards to a scan start position wherein the drawing edge 62 is at a predetermined distance from the line of sensing fibers on the scan head 64. The backward movement step is indicated by numeral 82 in FIG. 4 and is followed by a reversal of the stepper motor drive 34 to reverse the movement of the drawing indicated at 84, for performing a scanning in the forward drawing direction. The scan is completed, data is stored and the feed rollers opened as indicated by step 86.

To insure a proper scan of drawings with low contrast, previewing can be obtained for a portion of the drawing. Upon a request for preview, the roller feed closes automatically onto the drawing and rapidly advances the drawing to the scan start line of the identified area. Data is converted and conditioned, as shown by settings of the drawing type, size, scan area and name shown by steps 88, 90, 92 and 94, and the resulting file is displayed as raster data on the CRT 66 and screen control 60. The captured data scrolls up the screen for evaluation. Light and low contrast level buttons 96 can be touched to change either the background noise or the line density. Scrolling and changing can continue until a satisfactory preview is obtained. When the preview is satisfactory, a single touch on a visually displayed scan button will terminate this process. The roll feed will then move the drawing automatically to the start line of the area to be scanned, and normal scanning will begin as described above with respect to steps 78, 80, 82, 84 and 86.

Usually, a request for scan will be made immediately after the setting of values and inserting a drawing. A scan request will cause the roller feed to close automatically and move the drawing back to the lead edge to test the scanning. As in the previous mode, data is converted and conditioned, and the resulting file scrolls up the screen until scanning is completed. After scanning, the drawing is positioned in an outfeed tray for easy removal by the operator.

While the invention has been described above with respect to its preferred embodiments, it should be understood that other forms and embodiments may be made without departing from the spirit and scope of the invention.

What is claimed is:

1. An automatic video digitizing system for document scanning wherein a document is inserted into a roller feed arrangement located adjacent a video scanning head, comprising:
   (a) at least one pair of document drive rollers initially spaced apart to permit said document to be inserted through the spacing between said drive rollers without damaging the input edges of said document;
   (b) means for moving said opposing drive rollers from said spaced-apart, non-feed position into contact with each other;
   (c) document sensing means for sensing the leading edge of said document;
   (d) motor drive means, responsive to said document sensing means for driving said document backwards to a predetermined starting position where a front edge of said document is located at a preset distance from said video scanning head; and
   (e) motor means for rotating said drive rollers for driving said document forward from said starting position for scanning said document.

2. System as recited in claim 1 wherein said means for moving said opposing drive rollers from said spaced-apart, non-feed position into contact with each other comprises a lift motor drive operatively connected to a lower drive roller of said pair of drive rollers for lifting said lower drive roller up and into contact with a respective upper drive roller with said document pressed therebetween for driving said document.

3. System as recited in claim 1 wherein said document drive rollers comprise two pairs of drive rollers, a front pair of drive rollers and a rear pair of drive rollers, with said pairs of drive rollers being respectively mounted in front of and behind said video scanning head, with each pair of drive rollers having an upper roller and a lower roller with said lower rollers being movable from said spaced-apart non-feed position into a contact position for driving said document.

4. System as recited in claim 1, further comprising means for sensing the front edge position of said document, and motor control means responsive to said document sensor means for causing said drive roller motor means for positioning said document at a starting position with its leading edge located at a predetermined distance from said video scanning head.

5. System as recited in claim 4 wherein said document sensor means comprises front sensor means located adjacent the front side of said video scanning head and rear document sensing means located adjacent the backside of said video scanning head.

6. System as recited in claim 4 wherein said motor control means for said drive rollers includes a stepper motor drive and a drive gear for selectively driving said drive rollers in a forward or reverse direction.

7. System as recited in claim 1 further comprising roller position sensor means operatively positioned for sensing the location of at least one of said drive rollers determining whether said drive rollers are in their spaced apart position or in their drive position, the output of said roller position sensor being used for controlling the activation of said motor means for said drive rollers.

8. System as recited in claim 1 wherein said pair of document drive rollers comprises an upper drive roller and a lower drive roller, and said means for moving said opposing said drive rollers from said spaced-apart, non-feed position into contact with each other comprises lift motor drive means associated operatively connected to said upper rollers and said lower rollers.

9. System as recited in claim 1 further comprising a support platform for said documents located at an area for inserting said document into said system, said support platform including a guide scale for assisting an operating in lining up said document being inserted into said system.

10. System as recited in claim 1 further comprising paper side edge sensor means adapted for detecting the side edge of said documents, said paper edge sensor providing an output to said drive means for stopping the movement of said document being advanced through said system.

11. System as recited in claim 1 wherein said video scanning head comprises a linear array of optical fibers arranged along the width of said drive rollers for scanning width of said document, optical fiber scanning head being located between a front pair of document drive rollers and a rear pair of document drive rollers for scanning the area on said document located between said front and rear pairs of drive rollers.

12. System as recited in claim 11 wherein said optical fiber scanning head terminates in a grid matrix of sensor fibers, and further comprising charge coupled device means arranged opposite to said fiber optic grid matrix for receiving the optical output of each fiber on said scanning head.

13. System as recited in claim 1, further comprising a touch screen CRT control means connected to said means for moving said opposing drive rollers and to said motor means for rotating said drive rollers for thereby controlling the forward and reverse movement of said document after its insertion between said opposing drive rollers.

14. System as recited in claim 13 wherein said touch screen control means includes means for previewing a document after insertion into said system for said previewing comprising adjusting system scanning parameters and parameters prior to the normal scanning operation.

15. Method for handling a document in an automatic video digitizing system, comprising:
   providing at least one pair of document drive rollers that are adjustable between an initial document receiving position wherein said opposing drive rollers are spaced apart to permit said document to be inserted through the spacing between said drive rollers, to a scanning position wherein said opposing drive rollers are essentially in contact with each other for driving said document therebetween in a forward or reverse direction;
   sensing the position of the leading edge of said document between said opposing said drive rollers and, in response to said document sensing, moving said document backwards to a predetermined starting position where said leading document edge is aligned with an initial scanning position; and moving said document between said drive rollers in a forward direction scanning said document.

16. Method as recited in claim 15 wherein, prior to said normal scanning, said document drive rollers driven in a rear direction for moving said document to said starting position with said leading edge aligned with a scan start position, after which scanning is enabled in said system.

* * * * *